United States Patent
Johnson et al.

(10) Patent No.: US 9,919,339 B2
(45) Date of Patent: Mar. 20, 2018

(54) OPTICAL FILM

(71) Applicant: 3M INNOVATIVE PROPERTIES COMPANY, St. Paul, MN (US)

(72) Inventors: Matthew B. Johnson, Woodbury, MN (US); Ryan T. Fabick, Shoreview, MN (US)

(73) Assignee: 3M INNOVATION PROPERTIES COMPANY, St. Paul, MN (US)

( * ) Notice: Subject to any disclaimer, the term of this patent is extended or adjusted under 35 U.S.C. 154(b) by 391 days.

(21) Appl. No.: 14/689,231

(22) Filed: Apr. 17, 2015

(65) Prior Publication Data

US 2015/0369984 A1   Dec. 24, 2015

Related U.S. Application Data

(60) Provisional application No. 62/013,876, filed on Jun. 18, 2014.

(51) Int. Cl.
| | | |
|---|---|---|
| *G02B 5/30* | (2006.01) | |
| *B05D 1/30* | (2006.01) | |
| *G02B 1/04* | (2006.01) | |
| *G02B 1/12* | (2006.01) | |
| *G02B 5/02* | (2006.01) | |
| *B05D 3/06* | (2006.01) | |
| *B05D 1/40* | (2006.01) | |

(52) U.S. Cl.
CPC ............... *B05D 1/30* (2013.01); *G02B 1/04* (2013.01); *G02B 5/0215* (2013.01); *G02B 5/3041* (2013.01); *G02B 5/3083* (2013.01); *B05D 1/40* (2013.01); *B05D 3/067* (2013.01)

(58) Field of Classification Search
CPC . B05D 1/30; B05D 1/40; B05D 3/067; G02B 5/3083; G02B 5/3041; G02B 5/0215; G02B 1/04; G02B 5/021; G02B 5/0221; B32B 3/30
See application file for complete search history.

(56) References Cited

U.S. PATENT DOCUMENTS

| | | |
|---|---|---|
| 3,610,729 A | 10/1971 | Rogers |
| 4,446,305 A | 5/1984 | Rogers |
| 4,540,623 A | 9/1985 | Im |
| 5,175,030 A | 12/1992 | Lu |
| 5,183,597 A | 2/1993 | Lu |
| 5,448,404 A | 9/1995 | Schrenk |

(Continued)

FOREIGN PATENT DOCUMENTS

| | | |
|---|---|---|
| KR | 10-2005-0094030 | 9/2005 |
| KR | 10-0785380 | 12/2007 |

OTHER PUBLICATIONS

Denker, "Advanced Polarizer Film for Improved Performance of Liquid Crystal Displays", SID Symposium Digest of Technical Papers, Jul. 5, 2012, vol. 37, No. 1, pp. 1528-1530.

*Primary Examiner* — Nancy R Johnson
(74) *Attorney, Agent, or Firm* — Clifton F. Richardson (57) ABSTRACT

An optical film including a thermoplastic birefringent multilayer optical film and a UV-cured layer disposed adjacent an outer layer of the multilayer optical film is described. The outer layer has a thickness in a range of about 0.5 micrometers to about 1.0 micrometers and the UV-cured layer includes a structured surface opposite the outer layer. The UV-cured layer has a Tg less than about 30° C. and has a pencil hardness in a range of 2B to 2H.

22 Claims, 3 Drawing Sheets

(56) References Cited

U.S. PATENT DOCUMENTS

| | | |
|---|---|---|
| 5,882,774 A | 3/1999 | Jonza |
| 5,995,690 A | 11/1999 | Kotz |
| 6,322,236 B1 | 11/2001 | Campbell |
| 6,352,761 B1 | 3/2002 | Hebrink |
| 6,368,699 B1 | 4/2002 | Gilbert |
| 6,459,514 B2 | 10/2002 | Gilbert |
| 7,104,776 B2 | 9/2006 | Merrill |
| 7,328,638 B2 | 2/2008 | Gardiner |
| 7,350,442 B2 | 4/2008 | Ehnes |
| 8,467,131 B2 | 6/2013 | Yu |
| 8,657,472 B2 | 2/2014 | Aronson |
| 2007/0047080 A1 | 3/2007 | Stover |
| 2008/0292820 A1* | 11/2008 | Padiyath ............ B32B 7/02 428/34 |
| 2011/0102891 A1 | 5/2011 | Derks |
| 2011/0272849 A1 | 11/2011 | Neavin |
| 2012/0008212 A1 | 1/2012 | Wang et al. |
| 2012/0064296 A1 | 3/2012 | Walker, Jr. |
| 2012/0147593 A1 | 6/2012 | Yapel |
| 2012/0229893 A1 | 9/2012 | Hebrink et al. |
| 2014/0133133 A1 | 5/2014 | Tyan et al. |

* cited by examiner

OPTICAL FILM

BACKGROUND

Thermoplastic birefringent multilayer optical films are generally formed by layering extruded polymers in feedblocks. In some manufacturing processes, depending on the size of the feedblock, processing conditions, and thickness of the extrudate, shear forces on the outer layers passing through the feedblock may be significant. This can cause layer breakup in the outer layers, often making the ultimate films unusable for their desired purpose. To protect the film throughout manufacturing, thick protective boundary layers or thick skin layers are provided.

SUMMARY

In some aspects of the present description, an optical film including a thermoplastic birefringent multilayer optical film and a UV-cured layer is provided. The thermoplastic birefringent multilayer optical film includes alternating first and second optical layers and a first outer layer immediately adjacent the alternating first and second optical layers. The first outer layer has an outer major surface, which is an outermost major surface of the thermoplastic birefringent multilayer optical film. The first outer layer has a thickness in a range of about 0.5 micrometers to about 1.0 micrometers. The UV-cured layer is disposed adjacent the outer major surface and includes a structured surface opposite the first outer layer. The UV-cured layer has a Tg less than about 30° C. and the UV-cured layer has a pencil hardness in a range of 2B to 2H.

In other aspects of the present description, articles including the optical film are provided and methods of making the optical film are provided.

DETAILED DESCRIPTION

In the following description, reference is made to the accompanying set of drawings that form a part of the description hereof and in which are shown by way of illustration specific embodiments. The figures are not necessarily to scale. Unless indicated otherwise, similar features for one embodiment may include the same materials, have the same attributes, and serve the same or similar functions as similar features for other embodiments. Additional or optional features described for one embodiment may also be additional or optional features for other embodiments, even if not explicitly stated, where appropriate. It is to be understood that other embodiments are contemplated and may be made without departing from the scope or spirit of the present description. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used herein, layers, components, or elements may be described as being adjacent one another. Layers, components, or elements can be adjacent one another by being in direct contact, by being connected through one or more other components, or by being held next to one another or attached to one another. Layers, components, or elements that are in direct contact may be described as being immediately adjacent.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters*, 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. These may be referred to as thermoplastic multilayer optical films. Such films are compatible with high volume manufacturing processes and can be made in large sheets and roll goods.

A multilayer optical film includes individual microlayers typically arranged as alternating first and second optical layers. The first and second optical layers have different refractive index characteristics so that some light is reflected at interfaces between adjacent microlayers. The alternating first and second optical layers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 μm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or one both sides of an optical packet. In the case of a single-packet multilayer optical film, the protective boundary layer may be on one or both external surfaces of the multilayer optical film.

Skin layers are sometimes added which occurs after the feedblock but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1 (Stover et al.), U.S. Patent Publication No. 2011/0102891 A1 (Derks et al.), and U.S. Pat. No. 7,104,776 (Merrill et al.). The films, having birefringence, may be referred to as thermoplastic birefringent multilayer optical films (MOFs).

These films have a variety of uses where the films are laminated to other film constructions (e.g. absorbing polarizers, polycarbonate or polyester sheets) and/or articles (e.g. LCD displays). At a point in each manufacturing process, there is typically a converting step where the MOF or laminated MOF is cut by any variety of processes, e.g. shear, rotary die, die press, laser, etc. One particular failure mode during these converting and subsequent handling steps (e.g. packaging, premask removal, display assembly, etc.) is the potential delamination of the multilayer construction. Delamination typically occurs in multilayer optical films between the outermost layer, which in some embodiments is a skin or a PBL or both a skin and a PBL, and optical layers. Delamination can then propagate into the multilayer optical film leaving a visible defect, which is undesirable.

In some applications, it is desirable to create a thinner multilayer optical film. In some embodiments, it may also be desirable to maintain optical performance such as gain and mechanical properties such as delamination resistance in these thinner films. Note that "thinner" as used here may also refer to the ability to add additional optically active (e.g., to improve optical performance) or inactive layers (e.g., to improve physical characteristics) yet preserve the same or similar thickness. Because the optical function of the microlayers in the reflective polarizer is linked to the specific optical thickness of each microlayer, it is often not possible to achieve the same optical properties simply by making each microlayer thinner. Also, reducing the number of microlayers can achieve a thinner film but the optical performance, for example, gain, will be reduced. Process changes may be made to increase optical performance but the delamination resistance is typically reduced by these process changes. Previously, it has been difficult to achieve a thinner multilayer optical film while maintaining both optical performance and delamination resistance. Further, it was thought that reducing the thickness of PBLs, while reducing overall thickness, would result in a film that would either fail in manufacture or have significant defects due to feedblock shear. Surprisingly, not only did thinner PBLs enable thinner overall multilayer optical films, but it also provided improved delamination resistance for the overall film while not having significant defects due to feedblock shear.

As used herein, an outer layer of a multilayer optical film is a layer extending from the alternating first and second optical layers to an outermost major surface of the multilayer optical film. In some embodiments, the outer layer is a PBL or a skin layer. In some embodiments, an outer layer includes a protective boundary layer adjacent the alternating first and second optical layers and a skin layer adjacent the protective boundary layer opposite the alternating first and second optical layers. As illustrated in the Examples, it has been found that that a multilayer optical film having a thin outer layer can provide enhanced delamination resistance over a multilayer optical film having a thicker outer layer. In some embodiments, a multilayer optical film is provided having an outer layer having a thickness less than about 1.2 micrometers or less than about 1.0 micrometers or less than about 0.9 micrometers.

In some applications it is desirable to add an additional layer or coating to an outer layer (e.g., skin layer and/or PBL) of a multilayer optical film. The additional layer may be a UV-cured layer that provides haze, diffusion, collimation, scratch resistance, indentation resistance, improved durability and/or improved adhesion to a substrate.

As illustrated in the Examples, it has been found that adhesion of the additional layer to the outer layer typically deceases if the thickness of the outer layer drops below a certain thickness that depends on the material used for the additional layer. Surprisingly it has been found that an ultraviolet (UV) curable material can be chosen for an additional layer that provides adequate adhesion to an outer layer of a multilayer optical film while allowing the outer layer to be thin enough for enhanced delamination resistance. In particular, it has been found that good adhesion properties are obtained when a UV-curable resin having a Tg when cured of less than about 30° C. is be applied to an outer layer of a multilayer optical film where the outer layer has a thickness of at least about 0.3 micrometers or at least about 0.5 micrometers. It has been found that both good adhesion (i.e., good bonding of the additional layer to the outer layer of the MOF) and good lamination properties (i.e., good bonding of the outer layer of the MOF to the optical layers of the MOF) are obtained when a UV-curable resin having a Tg when cured of less than about 30° C. is applied to an outer layer of a multilayer optical film where the outer layer has a thickness between about 0.5 micrometers and about 1.0 micrometers. In some embodiments, a multilayer optical film includes an outer layer having a thickness in the range of 0.3 micrometers or 0.5 micrometers to 1.0 micrometers or 1.2 micrometers.

In some embodiments, the UV-cured layer has a Tg of less than about 30° C., or less than about 25° C. or less than about 20° C. In some embodiments, the UV-cured layer has a Tg of greater than about −10° C., or greater than about 0° C. or greater than about 10° C. In some embodiments the UV-cured layer has a pencil hardness in a range of 2B to 2H. Pencil hardness can be measured as described in the ASTM D3363-05 test standard.

Tg and pencil hardness of a UV-cured layer can be adjusted by a suitable selection of resin components. In some embodiments, the UV-cured layer includes a UV-cured urethane. In some embodiments, the UV-cured urethane is a UV-cured aliphatic urethane acrylate. Suitable UV-curable resins include a formulation having about 55 to 65 weight percent of an aliphatic urethane acrylate, such as PHOTOMER 6210 (available from IGM Resins USA Inc., Charlotte, N.C.), about 35-45 weight percent of a reactive diluent, and about 0.25 to about 1 weight percent of a photoinitiator, such as IRGACURE TPO (available from BASF, Florham Park, N.J.). The reactive diluent may be a blend of about 45 to about 55 weight percent hexanediol diacrylate (HDDA) and about 45 to about 55 weight percent trimethylopropane triacrylate (TMPTA).

Figure 1:
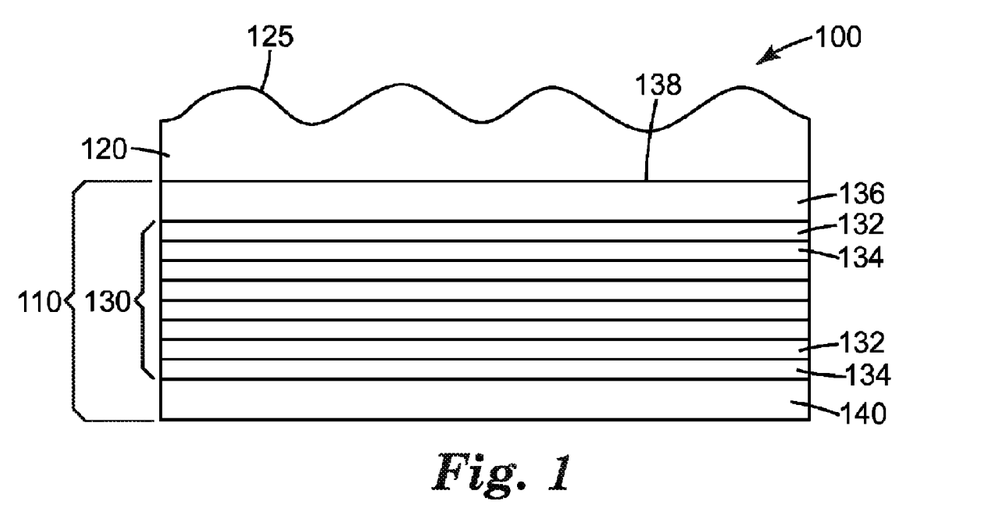
FIG. 1 is a schematic side view of an optical film.

FIG. 1 is a schematic side view of optical film 100 which includes thermoplastic birefringent multilayer optical film 110 and UV-cured layer 120 having structured surface 125. Multilayer optical film 110 includes alternating first and second optical layers 130 which includes a plurality of first optical layers 132 and second optical layers 134. Multilayer optical film 110 also includes a first outer layer 136 immediately adjacent alternating first and second optical layers 130. First outer layer 136 includes outer major surface 138 which is an outermost major surface of the multilayer optical film 110. Multilayer optical film 110 may also include a second outer layer 140 adjacent alternating first and second optical layers 130 opposite first outer layer 136. In some embodiments, multilayer optical film 110 may include a total of 50 to 400 optical layers 132 and 134.

Multilayer optical film 110 may be thinner than 50 μm, thinner than 30 μm, thinner than 20 μm, or thinner than 17 μm. Multilayer optical film 110 may be thicker than 5 μm or thicker than 10 μm. In some embodiments, UV-cured layer 120 has a thickness between about 2 micrometers and about 10 micrometers.

In some embodiments, the UV-cured layer is substantially homogeneous. That is, there are no particles or other inhomogeneities that would cause bulk scattering of light passing through the UV-cured layer. In some embodiments, the haze of optical film 100 is generated by the structured surface 125, which may be a microstructured surface having a characteristic length scale, such as pitch or feature size, of about 1 micrometer to about 100 micrometers or to about 1 mm. In some embodiments, UV-cured layer 120 is a substantially surface-scattering layer. That is, UV-cured layer 120 provides scattering of light passing through the UV-cured layer substantially only at the structured surface 125 and scattering from the bulk of UV-cured layer 120 is negligible or substantially negligible. In some embodiments, a surface haze of the UV-cured layer 120 is at least about 75 percent of a total haze of the optical film 100. In some embodiments, the surface haze of the UV-cured layer 120 is in a range of about 75 percent to about 85 percent of the total haze of the optical film 100. In some embodiments, the surface haze of the UV-cured layer 120 is in a range of about 85 percent to about 95 percent of the total haze of the optical film 100. In some embodiments, the surface haze of the UV-cured layer 120 is about 95 percent or more of the total haze of the optical film 100.

As recognized by those skilled in the art, the haze generated by a structured surface can be selected by choosing an appropriate geometry for the structured surface. Suitable geometries are described, for example, in U.S. Pat. No. 8,657,472 (Aronson et al.) and U.S. Pat. App. Pub. No. 2012/0147593 (Yapel et al.). Haze can be measured using, for example, a HAZE-GARD PLUS haze meter (available from BYK-Gardiner, Silver Springs, Md.) which is specified to measure haze in accordance with the ASTM D1003-13 standard. Optical film 100 may have a haze greater than about 5 percent or greater than about 10 percent or greater than about 20 percent. Optical film 100 may have a haze in the range of about 5 percent to about 100 percent, for example.

In some embodiments, optical film 100 has no visible cracks following mandrel bend testing with a mandrel having a diameter of 8 mm. That is, when optical film 100 is bent around a mandrel having a diameter of 8 mm with the UV-cured layer facing away from the mandrel, no cracking of the optical film is observed. Mandrel bend testing is described in ISO 1519: 2002(E) Paint and Varnishes—Bend Test (Cylindrical Mandrel), ISO 1519 Second Edition 2002 Mar. 15, ISO, Geneva Switzerland, 2002. In some embodiments, optical film 100 has no visible cracks following mandrel bend testing with a mandrel having a diameter of 4 mm.

Figure 2:
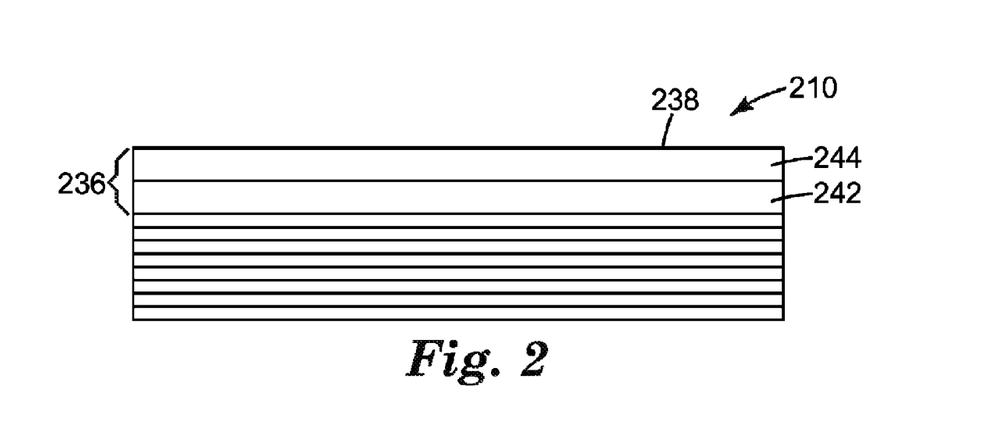
FIG. 2 is a schematic side view of a multilayer optical film.

First outer layer 136 may include a skin layer and a protective boundary layer. This is illustrated in FIG. 2 where multilayer optical film 210 having outer layer 236 and outer major surface 238 includes a protective boundary layer 242 and a skin layer 244. Skin layer 244 includes outer major surface 238.

Figure 3:
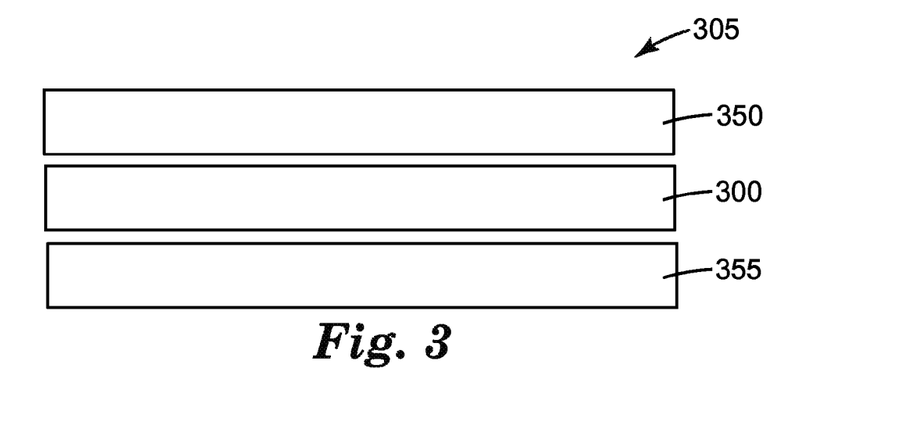
FIG. 3 is a schematic side view of a display.

FIG. 3 schematically shows a side view of optical film 300, which may correspond with optical film 100, incorporated into a display 305 including a display panel 350, which may be a liquid crystal display panel, and backlight 355. Optical film 300, which is disposed adjacent display panel 350 and between display panel 350 and backlight 355, may be a reflective polarizer and may include a UV-cured layer adjacent an outer layer of a multilayer optical film. In some embodiments the UV-cured layer faces display panel 350 and in other embodiments the UV-cured layer faces backlight 355.

Figure 4:
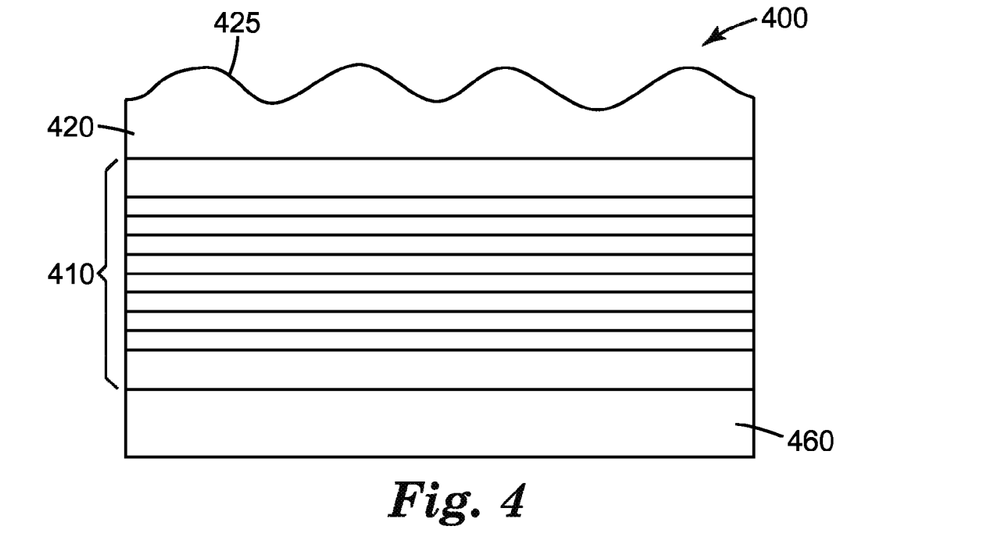
FIG. 4 is a schematic side view of an optical film.

FIG. 4 is a schematic side view of optical film 400 which includes thermoplastic birefringent multilayer optical film 410, UV-cured layer 420 that is disposed adjacent an outer major surface of the multilayer optical film 410 and has a structured surface 425, and absorbing polarizer 460 adjacent the thermoplastic birefringent multilayer optical film 410 opposite UV-cured layer 420. Absorbing polarizer 460 may be laminated to multilayer optical film 410 using an optically clear adhesive or absorbing polarizer 460 may be disposed adjacent multiplayer optical film 410 with an air gap separating the absorbing polarizer 460 and the multilayer optical film 410. Absorbing polarizer 460 may have a first pass axis and multilayer optical film 410 may be a reflective polarizer having a second pass axis substantially parallel to the first pass axis.

The structured surface of the optical films of the present description can be made using any suitable fabrication method. For example, the UV-curable resin can be applied in a continuous cast and cure process to produce a UV-cured layer having a structured surface opposite the outer layer of the MOF. The structures may be fabricated using microreplication from a tool by casting and curing a polymerizable resin composition in contact with a tool surface such as described in U.S. Pat. No. 5,175,030 (Lu et al.), U.S. Pat. No. 5,183,597 (Lu), and U.S. Pat. App. Pub. No. 2012/0064296 (Walker, J R. et al.). The tool may be fabricated using any available fabrication method, such as by using engraving or diamond turning. Exemplary diamond turning systems and methods can include and utilize a fast tool servo (FTS) as described in, for example, U.S. Pat. No. 7,350,442 (Ehnes et al.), U.S. Pat. No. 7,328,638 (Gardiner et al.), and U.S. Pat. No. 6,322,236 (Campbell et al.). In some embodiments, the resin used in the UV-cured layer includes a solvent and in some embodiments, the outer layer of the MOF is corona treated prior to applying the UV-cured layer.

Figure 5:
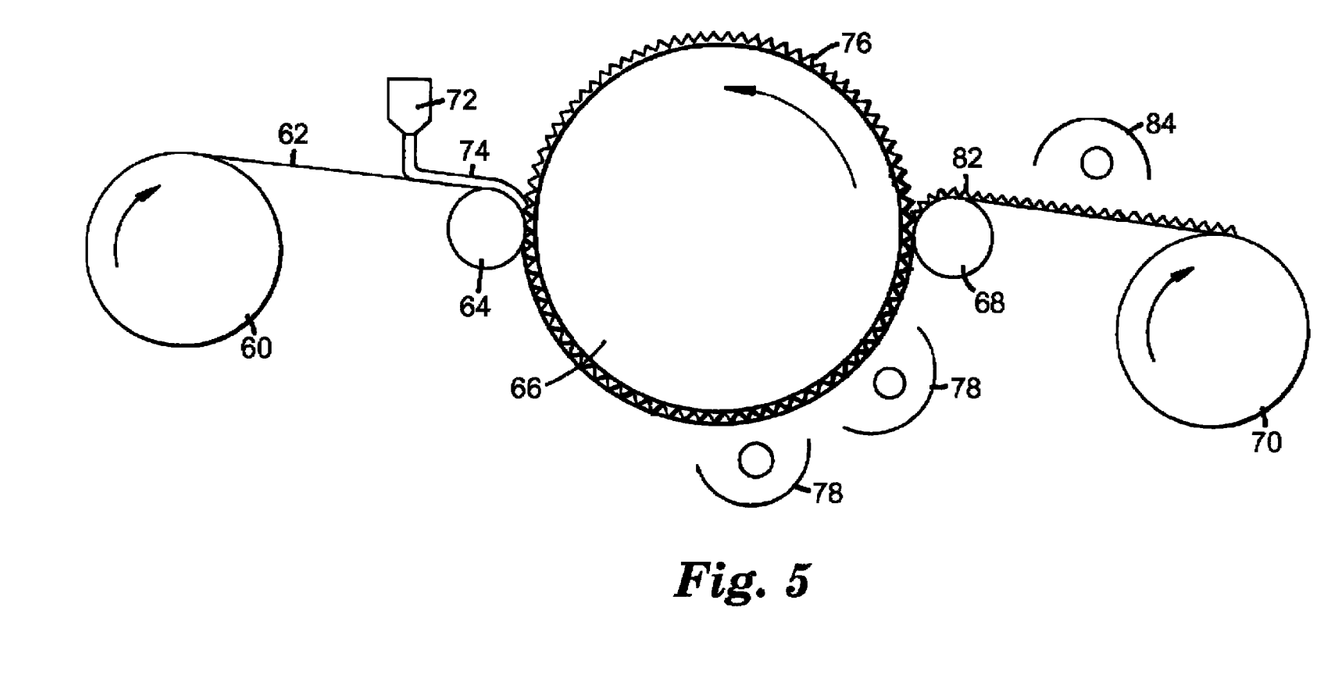
FIG. 5 illustrates a process for making an optical film.

FIG. 5 illustrates a continuous cast and cure method of manufacturing an optical film using a UV-curable resin and a thermoplastic birefringent multilayer optical film (MOF). A roll 60 of MOF 62 is provided. Roll 60 dispenses MOF 62 to a first pinch roller 64, where the MOF 62 is pinched between the first pinch roller 64 and a molding drum 66. A second pinch roller 68 is located at approximately 180° around the molding drum 66 from the first pinch roller 64, where the MOF 62 is peeled off the molding drum 66. The first and second pinch rollers 64 and 68 hold the MOF 62 therebetween in close contact with the molding drum 66. A second roll 70 receives the MOF 62 after it has been peeled off the molding drum 66. A dispenser 72 dispenses a flowable, transparent, UV-curable resin 74 so as to flow between the MOF 62 and the molding drum 66. The MOF 62 between the first and second pinch rollers 64 and 68 molds the resin by holding it against a molding surface 76 on the molding drum 66. The molding surface 76 is shaped to mold a desired structured surface into the UV-curable resin. A first UV light source 78 illuminates the resin 74 as it passes between the first and second pinch rollers 64 and 68, so as to achieve at least partial curing of the resin 74. The resin 74 adheres to the MOF 62 to form optical film 82 which is peeled off the molding drum 66 at the second pinch roller 68. A second UV light source 84 may be used for further curing.

In any embodiments of the present description, the UV-cured layer may have a refractive index in the range of 1.46 to 1.64.

EXAMPLES

Materials

| Trade name or Abbreviation | Description | Available from |
|---|---|---|
| Photomer 6210 | aliphatic urethane diacrylate | Sartomer Americas, Exton, PA |
| HDDA | 1,6-hexanediol diacrylate | Sigma-Aldrich Chemical Company, Milwaukee, WI |
| TMPTA | trimethylolpropane triacrylate | Sigma-Aldrich Chemical Company, Milwaukee, WI |
| TPO | IRGACURE TPO photoinitiator | BASF, Florham Park, NJ |
| PEA | phenoxyethyl acrylate | Sigma-Aldrich Chemical Company, Milwaukee, WI |
| CN-120 | epoxy acrylate | Sartomer Americas, Exton, PA |
| DAROCUR 1173 | photoinitiator | BASF, Ludwigshafen, Germany. |

Delamination Test Method

Film samples were prepared and cut into 1 inch (2.54 cm) wide by 12 inch (30 cm) strips. Double sided tape (3M 665 Double Sided Tape available from 3M Company, St. Paul, Minn.) was attached to a metal plate and a sample strip was attached to the double sided tape. The excess film was cut from one end of the plate so that the film was flush with that edge of the plate while the other edge was scored by cutting at a sharp angle with a razor blade. One end of an approximately 1.5 in (4 cm) strip of tape (3M 396 tape available from 3M Company, St. Paul, Minn.) was folded onto itself to form a ½ inch (1.3 cm) non-sticky tab. The other end of the tape was applied to the scored edge of the film sample. A 90 degree peel test was then performed using an IMASS SP-2000 peel tester (IMASS Inc., Accord, Mass.) with a peel speed of 60 in/min (1.5 m/min) using a 5 second averaging time. Five strips were tested for each film sample. For the results given in the Examples, the minimum value is reported for sake of comparing weakest or lowest force required to delaminate layers from each other. The MOF samples had a substantially linear layer profile within the alternating layer optical packet.

Adhesion Test Method

Adhesion testing was performed according to ASTM D3359-09e2. For the results given in Table 1, the degree of delamination was reported according to the criteria for ASTM D3359-09e2, with 5B the best result and 1B the worst.

Optical Haze Measurement

Haze values were measured using a HAZE-GARD PLUS haze meter (available from BYK-Gardiner, Silver Springs, Md.).

Formulations for UV-Curable Resins

Resin Formulation 1

Resin Formulation 1 was made by combining the components according to the weight percentages indicated in Table 1.

TABLE 1

| Components | Approximate Weight Percent |
|---|---|
| Photomer 6210 | 60 |
| HDDA | 20 |
| TMPTA | 20 |
| TPO | 0.5 |

The $T_g$ of the cured Resin Formulation 1 was measured by Dynamic Mechanical Analysis (DMA) using the elastic modulus and found to be about 17° C. The pencil hardness of a UV-cured layer of Resin Formulation 1 was determined as described in the ASTM D3363-05 test standard and found to be in the range of HB to F.

Resin Formulation 2

Resin Formulation 2 was made by combining the components according to the weight percentages indicated in Table 2.

TABLE 2

| Components | Approximate Weight Percent |
|---|---|
| Epoxy acrylate similar to CN-120 | 65 |
| PEA | 25 |
| TMPTA | 10 |
| TPO | 0.5 |

The $T_g$ of the cured Resin Formulation 2 was measured by Dynamic Mechanical Analysis (DMA) using the elastic modulus and found to be about 45° C. The pencil hardness of a UV-cured layer of Resin Formulation 2 was determined as described in the ASTM D3363-05 test standard and found to be in the range of H to 2H.

Resin Formulation 3

Resin Formulation 3 was made by combining the components according to the weight percentages indicated in Table 3.

TABLE 3

| Components | Approximate Weight Percent |
|---|---|
| CN-120 | 75 |
| PEA | 25 |
| DAROCUR 1173 | 0.25 |
| TPO | 0.1 |

The $T_g$ of the cured Resin Formulation 3 was measured by Dynamic Mechanical Analysis (DMA) using the elastic modulus and found to be about 45° C. The pencil hardness of a UV-cured layer of Resin Formulation 2 was determined as described in the ASTM D3363-05 test standard and found to be in the range of H to 2H.

MOF 1

A birefringent reflective polarizer was prepared as follows. A single multilayer optical packet was co-extruded comprised of 275 alternating layers of 90/10 PEN-co-PET, a polymer composed of 90% polyethylene naphthalate (PEN) and 10% polyethylene terephthalate (PET), and a low index isotropic layer, which was made with a blend of polycarbonate and copolyester (PC-co-PET) such that the index of refraction is about 1.57 and remains substantially isotropic upon uniaxial orientation, wherein the PC-co-PET molar ratio is approximately 42.5 mol % PC and 57.5 mol % coPET and has a $T_g$ of 105° C. The 90/10 PEN-co-PET and PC-co-PET polymers were fed from separate extruders to a multilayer coextrusion feedblock, in which they were assembled into a packet of 275 alternating optical layers, plus a thicker protective boundary layer of the PC-co-PET, on each side, for a total of 277 layers. After the feedblock, a skin layer was added where the polymer used for the skin layers was a second PC-co-PET comprising approximately 50 mol % PC and 50 mol % PET, having a $T_g$ of 110° C. The multilayer melt was then cast through a film die onto a chill roll, in the conventional manner for polyester films, upon which it was quenched. The cast web was then stretched in a parabolic tenter as generally described in the Invited Paper 45.1, authored by Denker et al., entitled "Advanced Polarizer Film for Improved Performance of Liquid Crystal Displays," presented at Society for Information Displays (SID) International Conference in San Francisco, Calif., June 4-9, at temperatures and draw ratios similar to those described in 20070047080 A1 (Stover et al) Example 2. The corresponding outer skin thickness was approximately 3 μm per side as measured by optical microscopy and Atomic Force Microscopy (AFM).

A secondary coating step was applied using each UV-curable resin formulation to add a diffuse functional layer using the method described in U.S. Pat. No. 8,657,472 (Aronson et al.) and U.S. Pat. App. Pub. No. 2012/0147593 (Yapel et al.). The coating thickness was approximately 5-7 μm and gave a resulting haze level of 28%. Adhesion testing was performed and the results are shown in Table 4. Additional haze levels from 17-90% were evaluated by changing the structure of the outer surface and additional thickness ranging from about 4 μm to about 8 μm were evaluated. There were no statistically significant differences in adhesion observed.

MOF 2

A birefringent reflective polarizer was prepared as follows. A single multilayer optical packet was co-extruded comprised of 275 alternating layers of 90/10 PEN-co-PET, a polymer composed of 90% polyethylene naphthalate (PEN) and 10% polyethylene terephthalate (PET), and a low index isotropic layer, which was made with a blend of polycarbonate and copolyesters (PC-co-PET) such that the index of refraction is about 1.57 and remains substantially isotropic upon uniaxial orientation, wherein the PC-co-PET molar ratio is approximately 42.5 mol % PC and 57.5 mol % PET and has a $T_g$ of 105° C. The 90/10 PEN-co-PET and PC-co-PET polymers were fed from separate extruders to a multilayer coextrusion feedblock, in which they were assembled into a packet of 275 alternating optical layers, plus a thicker protective boundary layer of the PC-co-PET on each side, for a total of 277 layers. The multilayer melt was then processed in a similar manner to MOF 1 and then a UV-cured layer was applied using each resin formulation as described for MOF 1. The corresponding outer layer thickness was approximately 1.2 μm per side as measured by optical microscopy and Atomic Force Microscopy (AFM). Adhesion testing was performed and the results are shown in Table 4. A variety of haze levels and a variety of thickness levels ranging from 4-8 μm were evaluated without significant affecting coating adhesion.

MOFs 3-6

Birefringent reflective polarizers were prepared in a similar manner to that of MOF 1 and MOF 2 with the exception that the first and second optical layers were assembled into specific optical packets of 220 (MOF 3), 190 (MOF 4) and 186 (MOFs 5-6) alternating optical layers of 90/10 PEN-co-PET, a polymer composed of 90% polyethylene naphthalate (PEN) and 10% polyethylene terephthalate (PET), and a low index isotropic layer, which was made with a blend of polycarbonate and copolyester (PC-co-PET) such that the index of refraction is about 1.57 and remains substantially isotropic upon uniaxial orientation, wherein the PC-co-PET molar ratio is approximately 42.5 mol % PC and 57.5 mol % coPET and has a $T_g$ of 105° C. The 90/10 PEN-co-PET and PC-co-PET polymers were fed from separate extruders to a multilayer coextrusion feedblock, in which they were assembled into a packet containing the number of alternating optical layers specified above. A thicker protective boundary layer of the PC-co-PET was then added to each side of each packet. The multilayer melt was then processed in a similar manner to MOF 1 and then a UV-cured layer was applied as described for MOF 1. Adhesion testing was performed and the results are shown in Table 4.

TABLE 4

| MOF No. | Outer layer thickness (μm) | UV-Cured Layer: Resin 1 Adhesion Score | UV-Cured Layer: Resin 2 Adhesion Score | UV-Cured Layer: Resin 3 Adhesion Score | Number of Optical Layers |
|---|---|---|---|---|---|
| 1 | 3 | 5B | 5B | 5B | 275 |
| 2 | 1.2 | 5B | 5B | 5B | 275 |
| 3 | 1 | 5B | 5B | 5B | 220 |
| 4 | 0.8 | 4B | 1B | 1B | 190 |
| 5 | 0.5 | 4B | 1B | 1B | 186 |
| 6 | 0.3 | 1B | 1B | 1B | 186 |

MOF 7

A birefringent reflective polarizer was prepared as follows. A single multilayer optical packet was co-extruded as described in US Patent Application Publication No. 2011/0102891, entitled "Low Layer Count Reflective Polarizer with Optimized Gain". Polymers generally described in U.S. Pat. No. 6,352,761 (Hebrink et al.) were used for the optical layers. The co-extruded optical packet contained 275 alternating layers of 90/10 coPEN, a polymer composed of 90% polyethylene naphthalate (PEN) and 10% polyethylene terephthalate (PET), and a low index isotropic layer. The low index isotropic layer was made with a blend of polycarbonate and copolyesters (PC:coPET) with the PC:coPET molar ratio of approximately 42.5 mol % polycarbonate and 57.5 mol % coPET. The low index layer had a refractive index of about 1.57 and remained substantially isotropic upon uniaxial orientation. The Tg of the PC:coPET was 105° C.

The reflective polarizer was manufactured using the feedblock method described in U.S. Patent Application Publication No. 2011/0272849 entitled "Feedblock for Manufacturing Multilayer Polymeric Films". The 90/10 PEN and PC:coPET polymers were fed from separate extruders to a multilayer coextrusion feedblock, in which they were assembled into a packet of 275 alternating optical layers, plus thicker protective boundary layers of the PC:coPET on each side, for a total of 277 layers. After the feedblock, skin layers were added where the polymer used for the skin layers was a second PC:coPET having ratio of 50 mol % PC and 50 mol % coPET and having a Tg of 110° C. The multilayer melt was then cast through a film die onto a chill roll, in the conventional manner for polyester films, upon which it was quenched. The cast web was then stretched in a parabolic tenter as described in US Pat. Publication No. 7,104,776 (Merrill et al.) at temperature and draw ratio given in Table 5. The film had a resulting thickness as measured by a capacitance gauge of approximately 26.5 μm. The corresponding total PBL plus skin thickness was approximately 6 μm (3 μm/side) as measured by optical microscopy and atomic force microscopy.

The minimum delamination peel force measured for MOF 7 was approximately 80 g/in (0.785 N/25.4 mm).

MOF 8

A birefringent reflective polarizer was prepared in a manner similar to MOF 7 as follows. A single multilayer optical packet was co-extruded containing of 275 alternating layers of 90/10 coPEN and PC:coPET. The 90/10 PEN and PC:coPET polymers were fed from separate extruders to a multilayer coextrusion feedblock, in which they were assembled into a packet of 275 alternating optical layers, plus thicker protective boundary layers of the PC:coPET on each side, for a total of 277 layers. The multilayer melt was then processed in a similar manner to MOF 7 with differences listed in Table 5. The corresponding total PBL thickness (where no skins were co-extruded) was approximately 2 μm (1 μm/side) as measured by optical microscopy and atomic force microscopy. The minimum delamination value measured for MOF 8 was approximately 120 g/in (1.18 N/25.4 mm). By removing the skin layer, the delamination strength was improved versus MOF 7 for similar process conditions and finished film thickness.

MOFs 9-11

A birefringent reflective polarizer was prepared in a similar manner to MOF 8 except that the first and second optical layers were assembled into a packet of 220 alternating optical layers, plus protective boundary layers of the PC:coPET on each side, for a total of 222 layers. The multilayer melt was then processed in a similar manner to MOF 8 with exception of certain parameters, listed in Table 5. No skin layers were applied. The resulting total thickness was 20 μm and the outer layer PBL thickness was approximately 1 μm on each side as measured by optical microscopy and atomic force microscopy. MOFs 9-11 had a similar cross-section to that of MOF 8, with the exception of lower layer count. The minimum delamination measured for MOF 9 was approximately 88 g/in (0.86 N/25.4 mm) for stretch ratio, PBL thickness and processing conditions similar to MOF 8. The delamination level for MOF 9 was reduced by approximately 27% from MOF 8. Further increasing draw ratio from 6× (MOF 9) to 6.3× (MOF 10) and then to 6.7× (MOF 11) reduced delamination strength by 52%. The result indicated that reducing the total thickness alone relative to MOF 8 was not sufficient to achieve improved delamination performance.

MOFs 12-17

A birefringent reflective polarizer was prepared in a similar manner to MOF 8 with the exception that the first and second optical layers were assembled into a packet of 183 alternating optical layers, plus protective boundary layers of the PC:coPET on each side, for a total of 185 layers. The multilayer melt was then processed in a similar manner to MOF 8 with exceptions listed in Table 5. The resulting total thickness was approximately 16.5 μm. The corresponding total PBL thickness (no skins were co-extruded) was approximately 0.7 μm (i.e., the outer layer thickness was 0.35 μm on each side) as measured by optical microscopy and atomic force microscopy. MOFs 12-17 had similar cross-sections to that of MOF 8, with the exception of lower layer count and PBL thickness. MOFs 12-17 had improved delamination resistance compared to MOF 7.

TABLE 5

| MOF No. | Optical Layer Count | Total Thick. (μm) | Outer Layer Thick. (μm) | Draw Ratio | Tenter Temp (° C.) | Min Avg Delam (g/in) |
|---|---|---|---|---|---|---|
| 7 | 275 | 26.6 | 3 | 6 | 151 | 80 |
| 8 | 275 | 26.6 | 1 | 6 | 151 | 120 |
| 9 | 220 | 20 | 1 | 6 | 149 | 88 |
| 10 | 220 | 20 | 1 | 6.3 | 149 | 68 |
| 11 | 220 | 20 | 1 | 6.7 | 149 | 58 |
| 12 | 183 | 16.5 | 0.35 | 6.3 | 149 | 1,400 |
| 13 | 183 | 16.5 | 0.35 | 6.3 | 147 | 280 |
| 14 | 183 | 16.5 | 0.35 | 6.5 | 152 | 1,200 |
| 15 | 183 | 16.6 | 0.35 | 6.5 | 149 | 620 |
| 16 | 183 | 16.4 | 0.35 | 6.5 | 152 | 1,200 |
| 17 | 183 | 16.3 | 0.35 | 6.5 | 151 | 800 |

The following is a list of exemplary embodiments of the present description:

Embodiment 1 is an optical film comprising:
　a thermoplastic birefringent multilayer optical film including:
　　alternating first and second optical layers;
　　a first outer layer immediately adjacent the alternating first and second optical layers, the first outer layer having an outer major surface, the outer major surface an outermost major surface of the thermoplastic birefringent multilayer optical film;
　　wherein the first outer layer has a thickness in a range of about 0.5 micrometers to about 1.0 micrometers; and
　a UV-cured layer disposed adjacent the outer major surface, wherein the UV-cured layer includes a structured surface opposite the first outer layer, the UV-cured layer has a Tg less than about 30° C., and the UV-cured layer has a pencil hardness in a range of 2B to 2H.

Embodiment 2 is the optical film of embodiment 1, wherein the optical film has a haze in the range of about 5 percent to about 100 percent.

Embodiment 3 is the optical film of embodiment 1, wherein the UV-cured layer includes a UV-cured urethane.

Embodiment 4 is the optical film of embodiment 3, wherein the UV-cured urethane is a UV-cured aliphatic urethane acrylate.

Embodiment 5 is the optical film of embodiment 1, where the thickness of the UV-cured layer is between about 2 micrometers and about 10 micrometers.

Embodiment 6 is the optical film of embodiment 1, wherein the UV-cured layer has a Tg less than about 25° C.

Embodiment 7 is the optical film of embodiment 1, wherein the optical film is a reflective polarizer.

Embodiment 8 is the optical film of embodiment 1, further comprising an absorbing polarizer disposed adjacent the thermoplastic birefringent multilayer optical film opposite the UV-cured layer, the absorbing polarizer having a first pass axis, wherein the thermoplastic birefringent multilayer optical film is a reflective polarizer having a second pass axis substantially parallel to the first pass axis.

Embodiment 9 is the optical film of embodiment 1, wherein the optical film has no visible cracks following mandrel bend testing with a mandrel having a diameter of 8 mm.

Embodiment 10 is the optical film of embodiment 1, wherein the optical film has no visible cracks following mandrel bend testing with a mandrel having a diameter of 4 mm.

Embodiment 11 is the optical film of embodiment 1, wherein the UV-cured layer is substantially homogeneous.

Embodiment 12 is the optical film of embodiment 1, wherein at least one of the alternating first and second optical layers are oriented birefringent polymer layers.

Embodiment 13 is the optical film of embodiment 1, wherein the first outer layer includes the same material as either the first or second optical layer.

Embodiment 14 is the optical film of embodiment 1, wherein the thermoplastic birefringent multilayer optical film further includes a second outer layer adjacent the alternating first and second optical layers opposite the first outer layer.

Embodiment 15 is the optical film of embodiment 1, wherein the first outer layer includes a protective boundary layer adjacent the alternating first and second optical layers and a skin layer adjacent the protective boundary layer opposite the alternating first and second optical layers.

Embodiment 16 is the optical film of embodiment 1, wherein the thermoplastic birefringent multilayer optical film includes 50 to 400 optical layers.

Embodiment 17 is the optical film of embodiment 1, wherein the first and second optical layers have a linear layer profile.

Embodiment 18 is the optical film of embodiment 1, wherein the structured surface is a microstructured surface.

Embodiment 19 is the optical film of embodiment 1, wherein the UV-cured layer is a substantially surface-scattering layer.

Embodiment 20 is the optical film of embodiment 1, wherein a surface haze of the UV-cured layer is at least about 75 percent of a total haze of the optical film.

Embodiment 21 is the optical film of embodiment 20, wherein the surface haze of the UV-cured layer is in a range of about 75 percent to about 85 percent of the total haze of the optical film.

Embodiment 22 is the optical film of embodiment 20, wherein the surface haze of the UV-cured layer is in a range of about 85 percent to about 95 percent of the total haze of the optical film.

Embodiment 23 is the optical film of embodiment 20, wherein the surface haze of the UV-cured layer is about 95 percent or more of the total haze of the optical film.

Embodiment 24 is the optical film of any of the previous embodiments, wherein the UV-cured layer has a refractive index in the range of 1.46 to 1.64.

Embodiment 25 is a roll of the optical film of embodiment 1.

Embodiment 26 is a display comprising the optical film of embodiment 1.

Embodiment 27 is a method of making an optical film, comprising the steps of:
providing a thermoplastic birefringent multilayer optical film including:
alternating first and second optical layers;
a first outer layer immediately adjacent the alternating first and second optical layers, the first outer layer having an outer major surface, the outer major surface an outermost major surface of the thermoplastic birefringent multilayer optical film;
wherein the first outer layer has a thickness in a range of about 0.5 micrometers to about 1.0 micrometers; and
forming a UV-cured layer onto the outer major surface of the first outer layer in a continuous cast and cure process,
wherein the UV-cured layer includes a structured surface opposite the first outer layer, the UV-cured layer has a Tg less than about 30° C., and the UV-cured layer has a pencil hardness in a range of 2B to 2H.

Embodiment 28 is the method of embodiment 27, wherein the UV-cured layer includes UV-cured aliphatic urethane acrylate having a Tg less than about 25° C.

Embodiment 29 is the method of embodiment 27, wherein the UV-cured layer has a refractive index in the range of 1.46 to 1.64.

Embodiment 30 is a method of making the optical film of any of embodiments 1-23 comprising the steps of:
providing the thermoplastic birefringent multilayer optical film, and
forming the UV-cured layer onto the outer major surface of the first outer layer of the thermoplastic birefringent multilayer optical film in a continuous cast and cure process.

The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical film comprising:
a thermoplastic birefringent multilayer optical film including:
alternating first and second optical layers;
a first outer layer immediately adjacent the alternating first and second optical layers, the first outer layer having an outer major surface, the outer major surface an outermost major surface of the thermoplastic birefringent multilayer optical film;
wherein the first outer layer has a thickness in a range of about 0.5 micrometers to about 1.0 micrometers; and
a UV-cured layer disposed adjacent the outer major surface, wherein the UV-cured layer includes a structured surface opposite the first outer layer, the UV-cured layer has a Tg less than about 30° C., and the UV-cured layer has a pencil hardness in a range of 2B to 2H.

2. The optical film of claim 1, wherein the optical film has a haze in the range of about 5 percent to about 100 percent.

3. The optical film of claim 1, wherein the UV-cured layer includes a UV-cured urethane.

4. The optical film of claim 3, wherein the UV-cured urethane is a UV-cured aliphatic urethane acrylate.

5. The optical film of claim 1, where the thickness of the UV-cured layer is between about 2 micrometers and about 10 micrometers.

6. The optical film of claim 1, wherein the UV-cured layer has a Tg less than about 25° C.

7. The optical film of claim 1, wherein the optical film is a reflective polarizer.

8. The optical film of claim 1, further comprising an absorbing polarizer disposed adjacent the thermoplastic birefringent multilayer optical film opposite the UV-cured layer, the absorbing polarizer having a first pass axis, wherein the thermoplastic birefringent multilayer optical film is a reflective polarizer having a second pass axis substantially parallel to the first pass axis.

9. The optical film of claim 1, wherein the optical film has no visible cracks following mandrel bend testing with a mandrel having a diameter of 8 mm.

10. The optical film of claim 1, wherein at least one of the alternating first and second optical layers are oriented birefringent polymer layers.

11. The optical film of claim 1, wherein the first outer layer includes the same material as either the first or second optical layer.

12. The optical film of claim 1, wherein the first outer layer includes a protective boundary layer adjacent the alternating first and second optical layers and a skin layer adjacent the protective boundary layer opposite the alternating first and second optical layers.

13. The optical film of claim 1, wherein the thermoplastic birefringent multilayer optical film includes 50 to 400 optical layers.

14. The optical film of claim 1, wherein the first and second optical layers have a linear layer profile.

15. The optical film of claim 1, wherein the structured surface is a microstructured surface.

16. The optical film of claim 1, wherein the UV-cured layer is a substantially surface-scattering layer.

17. The optical film of claim 1, wherein a surface haze of the UV-cured layer is at least about 75 percent of a total haze of the optical film.

18. The optical film of claim 17, wherein the surface haze of the UV-cured layer is in a range of about 75 percent to about 85 percent of the total haze of the optical film.

19. The optical film of claim 17, wherein the surface haze of the UV-cured layer is in a range of about 85 percent to about 95 percent of the total haze of the optical film.

20. The optical film of claim 17, wherein the surface haze of the UV-cured layer is about 95 percent or more of the total haze of the optical film.

21. A display comprising the optical film of claim 1.

22. A method of making the optical film of claim 1 comprising the steps of:
   providing the thermoplastic birefringent multilayer optical film, and
   forming the UV-cured layer onto the outer major surface of the first outer layer of the thermoplastic birefringent multilayer optical film in a continuous cast and cure process.

* * * * *

UNITED STATES PATENT AND TRADEMARK OFFICE
CERTIFICATE OF CORRECTION

| | | |
|---|---|---|
| PATENT NO. | : 9,919,339 B2 | Page 1 of 1 |
| APPLICATION NO. | : 14/689231 | |
| DATED | : March 20, 2018 | |
| INVENTOR(S) | : Matthew Johnson | |

It is certified that error appears in the above-identified patent and that said Letters Patent is hereby corrected as shown below:

On the Title Page

Item [73], Line 1, delete "INNOVATION" and insert -- INNOVATIVE --, therefor.

Signed and Sealed this
Twentieth Day of November, 2018

Andrei Iancu
*Director of the United States Patent and Trademark Office*